(12) United States Patent
Hotani (10) Patent No.: US 7,238,284 B2
(45) Date of Patent: Jul. 3, 2007

(54) APPARATUS FOR PROCESSING ALKALINE SOLUTION

(75) Inventor: Setsuo Hotani, Kaiso-gun (JP)

(73) Assignee: Hotani Co., Ltd., Wakayama-ken (JP)

( * ) Notice: Subject to any disclaimer, the term of this patent is extended or adjusted under 35 U.S.C. 154(b) by 199 days.

(21) Appl. No.: 11/166,242

(22) Filed: Jun. 27, 2005

(65) Prior Publication Data

US 2006/0091054 A1 May 4, 2006

(30) Foreign Application Priority Data

Oct. 28, 2004 (JP) .............................. 2004-313860

(51) Int. Cl.
*C02F 1/24* (2006.01)
(52) U.S. Cl. .............................. 210/221.2; 210/221.1; 210/195.1; 210/197
(58) Field of Classification Search ............. 210/221.1, 210/221.2, 195.1, 197
See application file for complete search history.

(56) References Cited

U.S. PATENT DOCUMENTS 3,642,617 A * 2/1972 Brink et al. ................. 210/704
3,787,316 A * 1/1974 Brink et al. ................. 210/608
5,188,135 A * 2/1993 Neumann et al. ......... 134/64 R
5,501,741 A * 3/1996 McMahon .................... 134/13
6,264,757 B1 * 7/2001 Lester et al. .................. 134/15

FOREIGN PATENT DOCUMENTS

| JP | 11-009903 A | * | 1/1999 |
| JP | 2002-326004 A | * | 11/2002 |
| JP | 2004-025026 A | * | 1/2004 |
| JP | 2004-202352 A | * | 7/2004 |

* cited by examiner

*Primary Examiner*—Thomas M. Lithgow
(74) *Attorney, Agent, or Firm*—Wenderoth, Lind & Ponack, L.L.P.

(57) ABSTRACT

An apparatus for processing an alkaline solution includes a storage tank storing the alkaline solution to be processed; a processing unit sucking a foam phase disposed on the liquid surface level of the alkaline solution in the storage tank, defoaming the foam phase by centrifugal separation, and extracting the foam phase outside the storage tank, the processing unit including an extraction tube; a separating tank separating scum and a liquid, the separating tank being connected to the extraction tube; a scum-discharging component discharging the scum in the separating tank outside the separating tank; and a liquid-discharging component discharging the liquid in the separating tank outside the separating tank. In the apparatus, the scum and the liquid separated in the separating tank are separately discharged outside the separating tank with the scum-discharging component and the liquid-discharging component, respectively.

22 Claims, 6 Drawing Sheets

APPARATUS FOR PROCESSING ALKALINE SOLUTION

BACKGROUND OF THE INVENTION

1. Field of the Invention

The present invention relates to an apparatus for processing foam on an alkaline solution that has been used for cleaning an object to be cleaned, such as a metal strip in the iron-manufacturing industry.

2. Description of the Related Art

In general, an alkaline solution for cleaning an object, such as a metal strip in the iron-manufacturing industry, is used in a desired cleaning process and the solution is then recovered in a storage tank. Subsequently, the alkaline solution is returned and reused in the object cleaning process. The alkaline solution is generally recycled a plurality of times.

On the alkaline solution recovered from the object cleaning process in the storage tank, a large amount of floating foam is present. The foam includes impurities such as oil. As is well known to those skilled in the art, these impurities significantly impair the cleaning performance of the object to be cleaned using the alkaline solution, and therefore, must be removed.

Hitherto, in order to remove the foam from an alkaline solution that has been used for cleaning a metal strip in the iron-manufacturing industry, a foam phase floating on the liquid surface level of the alkaline solution in a storage tank is separated from the liquid. The methods are broadly divided into the following types (1) and (2):

(1) A method including the step of removing the foam on the alkaline solution in the storage tank with a suction unit.

(2) A method including the steps of sucking the foam on the alkaline solution in the storage tank, defoaming the foam by centrifugal separation, and returning the total mixture of the fine foam formed by the defoaming step and the liquid to the storage tank.

In method (1), the foam overflows from the storage tank. Unfortunately, the overflowed foam contaminates the surrounding floor face, and in addition, a drainage ditch of the solution is covered with the overflowed foam. In this method, the amount of waste of the foam is significant and is as large as about 10 to about 20 tons per day. Accordingly, this method causes a serious pollution problem due to the overflowing of the foam.

In method (2), the foam generated in the storage tank and the foam generated from the mixture solution that is returned to the storage tank are mixed, thereby increasing the amount of foam. Furthermore, as the amount of foam increases, the foam quality is deteriorated. When the above-described steps of sucking the foam, defoaming the foam, and returning the solution (i.e., returning the mixture to the storage tank) are repeated for about 10 days, the foam is changed to a soft cream-like scum. (In the iron-manufacturing industry, the operation is actually continued for at least 15 to 30 days.) The deterioration of the foam quality contaminates the alkaline solution in the storage tank. This phenomenon is not preferable to the cleaning of an object to be cleaned.

In order to solve this problem in method (2), when the mixture is not returned to the storage tank but disposed of, the amount of waste is significant and is as large as about 10 to about 20 tons per day, thus causing many problems. Furthermore, in order to compensate for the loss in detergency, a detergent is added to the alkaline solution that is used repeatedly. In the above case, the consumption of the detergent is significantly increased. Also, the cost is significantly increased.

In other words, an effective processing of foam on the alkaline solution in the storage tank, the decrease in the detergent consumption, and an effective and highly practical removal of the scum have not been achieved yet by the known methods.

SUMMARY OF THE INVENTION

Accordingly, in order to solve the above problems in the known methods, in a processing of an alkaline solution that has been used for cleaning an object to be cleaned, such as a metal strip in the iron-manufacturing industry, it is an object of the present invention to achieve an effective processing of foam of the alkaline solution in a storage tank, the decrease in the detergent consumption, and an effective and highly practical removal of the scum.

In order to solve the above problems, according to the present invention, a process for removing the foam on an alkaline solution to be processed is performed as follows.

An apparatus for processing an alkaline solution includes a storage tank storing the alkaline solution to be processed; a processing unit sucking a foam phase disposed on the liquid surface level of the alkaline solution in the storage tank, defoaming the foam phase by centrifugal separation, and extracting the foam phase outside the storage tank, the processing unit including an extraction tube; a separating tank separating scum and a liquid, the separating tank being connected to the extraction tube; a scum-discharging component discharging the scum in the separating tank outside the separating tank; and a liquid-discharging component discharging the liquid in the separating tank outside the separating tank. In the apparatus, the scum and the liquid separated in the separating tank are separately discharged outside the separating tank with the scum-discharging component and the liquid-discharging component, respectively.

A preferable example of the processing unit includes the following structure. The processing unit preferably includes an impeller and a casing including the impeller therein. The casing preferably includes the suction tube leading to the foam phase area of the alkaline solution in the storage tank and an extraction tube leading to the separating tank.

An example of the scum-discharging component discharging the scum separated from the liquid in the separating tank outside the separating tank preferably includes a scum outlet and a scraper. The scraper preferably extends along the liquid surface level of the liquid in the separating tank and moves on the liquid surface level so as to collect or scrape away the scum disposed on the liquid surface level toward the scum outlet provided in the separating tank. The leading edge of the scraper is preferably disposed in the vicinity of the inner peripheral wall of the separating tank.

An example of the liquid-discharging component discharging the liquid separated from the scum in the separating tank outside the separating tank preferably includes a tube having a solenoid valve provided between the separating tank and the storage tank.

The scum outlet of the separating tank is preferably a scum-discharging opening forming a trough in the vertical direction, the scum-discharging opening being composed of a soft material or a flexible material. Preferably, the position (i.e., height) of an end (i.e., upper edge) of the scum-discharging opening in which the scum enters corresponds to the trajectory formed by the lower edge of the scraper. More preferably, the position of the end of the scum-discharging opening in which the scum enters is somewhat higher than the trajectory formed by the lower edge of the scraper. The above phrase "the position (i.e., height) of an end (i.e., upper edge) of the scum-discharging opening in which the scum enters corresponds to the trajectory formed by the lower edge of the scraper" means the following: When the scraper passes on the upper edge of the scum-discharging opening, the lower edge of the scraper is lightly in contact with the upper edge of the scum-discharging opening or a small space is formed between the lower edge of the scraper and the upper edge of the scum-discharging opening.

In the present invention, the foam phase disposed on the liquid surface level of the alkaline solution in the storage tank is sucked outside of the storage tank with the processing unit and is defoamed by centrifugal separation. The foam phase defoamed by centrifugal separation provides a mixture of fine foam and a liquid. This mixture is extracted from the extraction tube of the processing unit and is supplied to the separating tank. Thus, the mixture is accumulated in the separating tank.

After a certain period of time passes, scum is generated on the liquid surface level in the separating tank. It is assumed that this generation of scum, which was found in the study of the present invention, is based on the phenomenon that the fine foam in the above mixture is separated or liberated from the mixture as time goes on.

The scum on the liquid surface level in the separating tank is discharged with the scum-discharging component outside the separating tank. The liquid disposed under the scum is discharged with the liquid-discharging component outside the separating tank. The liquid separated from the scum in the separating tank is preferably recovered in the storage tank.

The amount of the scum discharged from the separating tank is about 1 ton per day. In contrast, the amount of foam discharged by the known method for processing the foam is about 10 to about 20 tons per day. Thus, the amount of discharge in the present invention is as small as about $\frac{1}{10}$ to about $\frac{1}{20}$ of that in the known method. Accordingly, the disposal cost of the foam can be significantly reduced compared with the cost by the known method.

Thus, according to the present invention, in a processing of an alkaline solution that has been used for cleaning an object to be cleaned, such as a metal strip in the iron-manufacturing industry, an effective processing of foam of the alkaline solution in a storage tank, the decrease in the detergent consumption, and an effective and highly practical removal of the scum can be achieved.

Furthermore, as is apparent from the above description, since the mixture of the fine foam and the liquid is not returned to the storage tank, the present invention can solve the problems in the known method for processing the foam by centrifugal separation. In other words, the present invention can solve the problems such as the increase in the amount of foam in the storage tank, the resultant deterioration of the foam quality in the storage tank, and the contamination of the alkaline solution due to deterioration of the foam quality.

According to an analytical result, the discharged scum from the separating tank includes impurities such as oil. The amount of impurities in the scum is considerable and is as high as about 140 g/kg (per kilogram of the amount of the scum phase). As is well known to those skilled in the art, the presence of these impurities is not preferable in the cleaning of an object to be cleaned using an alkaline solution. As described above, in the present invention, the mixture of fine foam, which is generated by centrifuging the foam phase sucked from the storage tank, and the liquid is returned not to the storage tank but to the separating tank. The scum is then separated from the liquid. Thus, the scum is separately removed from the liquid. Accordingly, the present invention is significantly useful to separate and remove the scum. In contrast, in the known method using centrifugal separation, the mixture of the fine foam and the liquid is returned to the storage tank. Therefore, impurities such as oil enter the storage tank and the amount of such impurities is gradually increased. These impurities adversely affect the recycle of alkaline solution that has been processed in the storage tank.

As described above, according to the present invention, in a processing of an alkaline solution that has been used for cleaning an object to be cleaned, such as a metal strip in the iron-manufacturing industry, an effective processing of foam of the alkaline solution in a storage tank, the decrease in the detergent consumption, and an effective and highly practical removal of the scum can be achieved. In addition, these advantages can be achieved at a significantly high level.

DESCRIPTION OF THE PREFERRED EMBODIMENT

Figure 1:
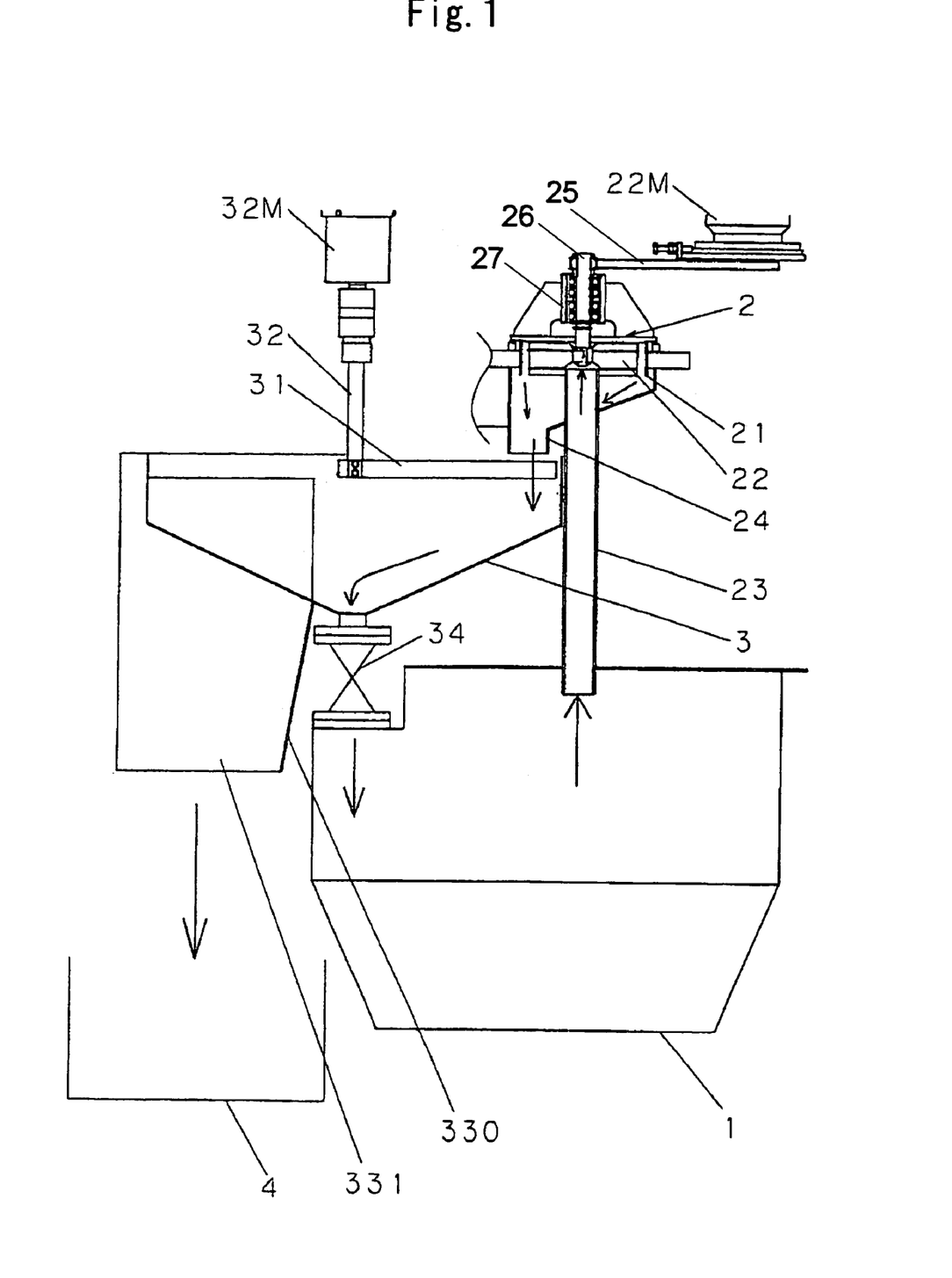
FIG. 1 is a cross-sectional elevational view showing an embodiment of an apparatus of the present invention.

An embodiment of the present invention will now be described with reference to the drawings with an example. The embodiment described below is an illustration that embodies the present invention and does not limit the technical scope of the present invention. Referring to FIG. 1, an apparatus includes a storage tank 1 storing an alkaline solution that has been used for cleaning a metal strip in the iron-manufacturing industry, a processing unit 2, and a separating tank 3.

Figure 3:
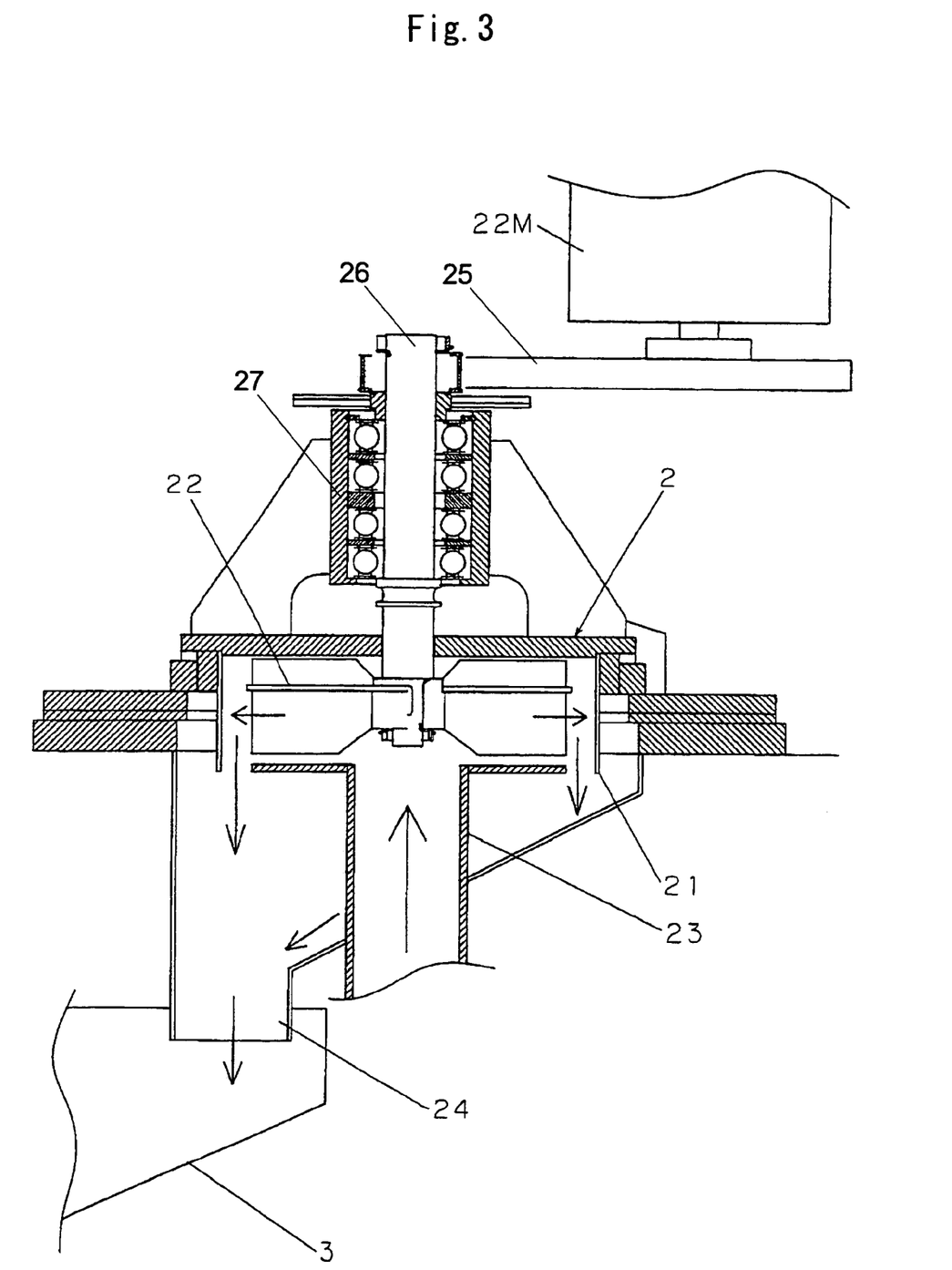
FIG. 3 is an enlarged view of a processing unit in the apparatus shown in FIG. 1 wherein a part of the unit is omitted.

The processing unit 2 is equipped with the storage tank 1. The processing unit 2 includes a casing 21 having a funnel-shaped bottom, an impeller 22 provided in the casing 21, a suction tube 23 extending from the casing 21 to a foam phase disposed on the liquid surface level of the liquid in the storage tank 1, and an extraction tube 24 leading to the outside of the storage tank 1. A motor 22M is connected to a first rotating shaft 26 of the impeller 22, with, for example, a transferring belt 25 therebetween so as to drive the impeller 22. The first rotating shaft 26 is rotatably supported with a bearing portion 27 disposed above the casing 21.

Figure 4:
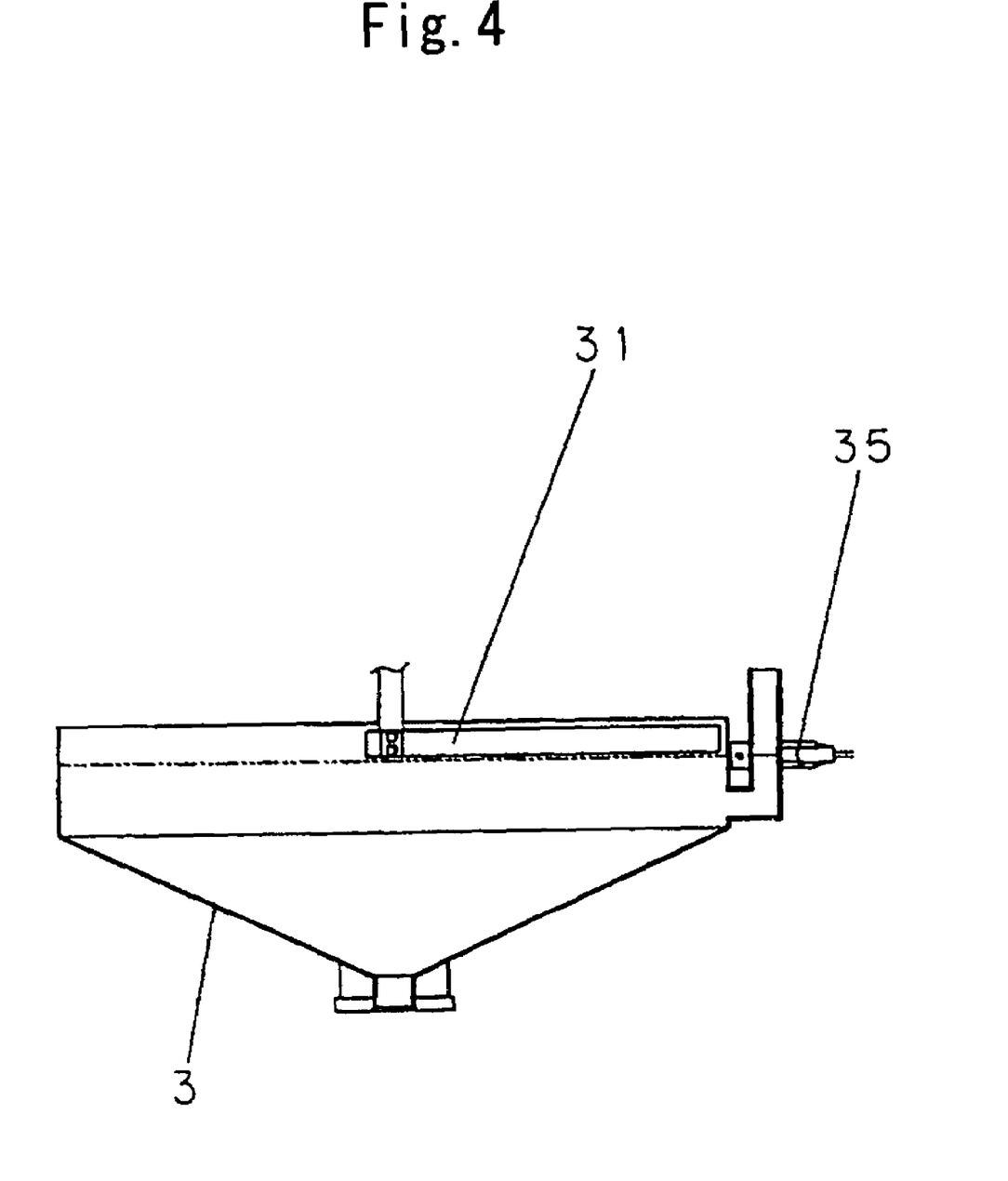
FIG. 4 is an elevational view of a separating tank in the apparatus shown in FIG. 1.
Figure 5:
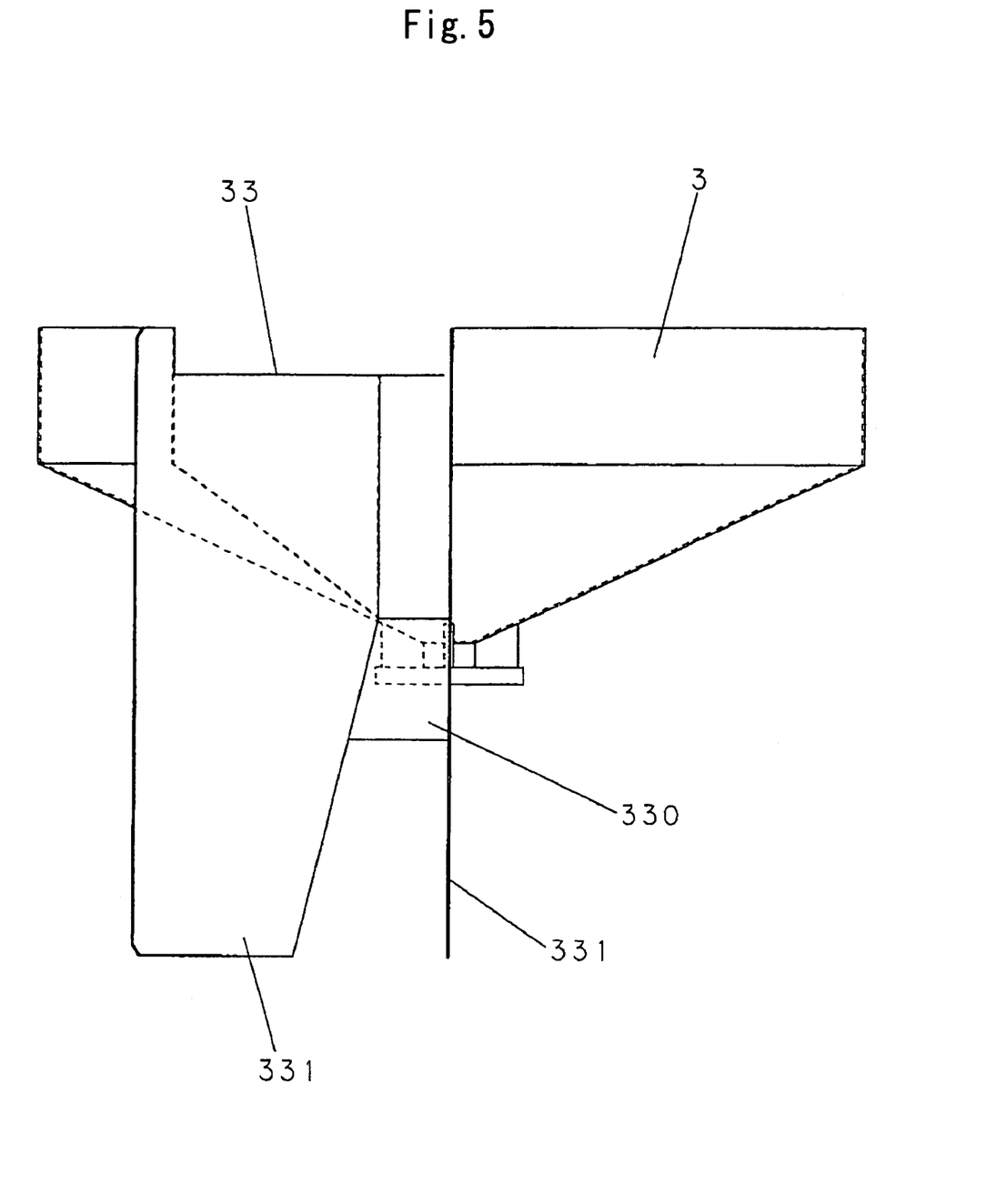
FIG. 5 is an enlarged view of the left side of FIG. 1 showing a part including a scum-discharging opening of the apparatus in the embodiment.

The separating tank 3 has a circular funnel shape and includes a scum collector 31 (hereinafter may be referred to as scraper) having a scraper shape. The scraper 31 is disposed at the upper end inside the separating tank 3 and extends in the horizontal direction. The scraper 31 is connected to a second rotating shaft 32 extending along the central line of the separating tank 3 in the vertical direction.

Figure 2:
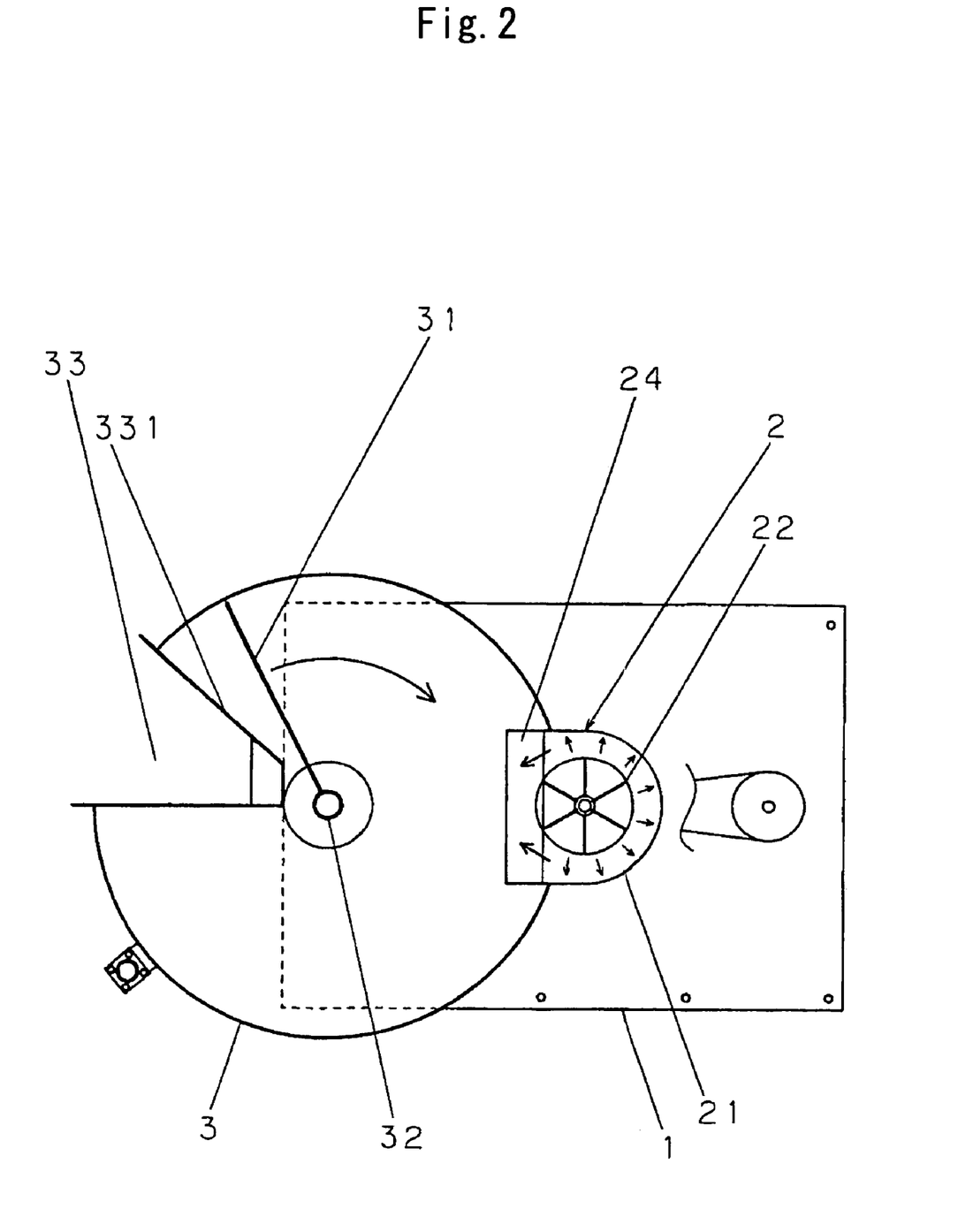
FIG. 2 is a plan view of FIG. 1.
Figure 6:
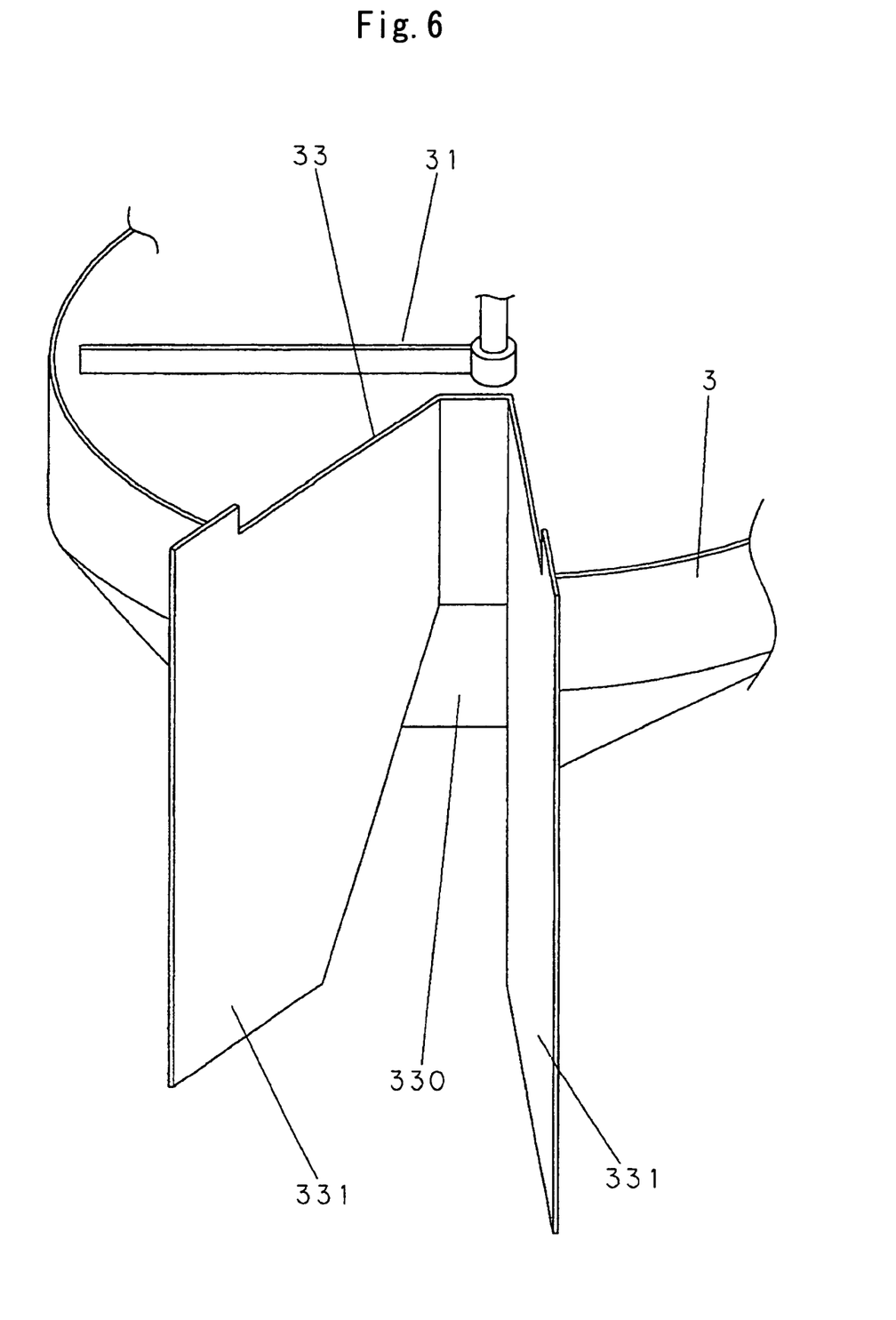
FIG. 6 is a perspective view of the scum-discharging opening.

The scraper 31 is rotated in the direction shown by the arrow in FIG. 2. The leading edge of the scraper 31 is disposed in the vicinity of the inner peripheral wall of the separating tank 3. The extraction tube 24 of the casing 21 extends to the opening of the upper end of the separating tank 3. The separating tank 3 includes a scum outlet or a scum-discharging opening 33. As shown in FIGS. 2 and 6, the scum-discharging opening 33 forms a recess having a trapezoidal cross-section converging from a part of the periphery of the separating tank 3 to the center of the separating tank 3. In other words, the scum-discharging opening 33 forms a trough in the vertical direction. The position of the upper edge of the scum-discharging opening 33, i.e., an end of the scum-discharging opening 33 in which the scum enters, is disposed so as to correspond to the trajectory formed by rotating the lower edge of the scraper 31. The lower end of a wall of the scum-discharging opening 33, the wall being adjacent to the center of the separating tank 3, forms a bottom 330. The bottom 330 converges from the central side to the periphery of the separating tank 3. Walls of the scum-discharging opening 33, the walls facing each other, form discharging guard plates 331. As shown in FIG. 1, an external sludge bag 4 is disposed below the scum-discharging opening 33.

The scum-discharging opening 33 is preferably composed of a soft material or a flexible material, for example, rubber. The upper edge of the scum-discharging opening 33 composed of a soft material or a flexible material and extending toward the center of the separating tank 3 is preferably disposed such that the position of the upper edge of the scum-discharging opening 33 is somewhat higher than the trajectory formed by rotating the lower edge of the scraper 31. In such a case, the lower edge of the scraper 31 passes on the upper edge of the scum-discharging opening 33 extending toward the center of the separating tank 3 so as to press the upper edge of the scum-discharging opening 33. Therefore, even when the liquid surface level of the separating tank 3 rises to reach the upper edge of the scum-discharging opening 33, the liquid in the separating tank 3 does not spill from the upper edge of the scum-discharging opening 33.

The leading edge of the scraper 31 is disposed in the vicinity of the inner peripheral wall of the separating tank 3. According to this structure, a scum phase disposed between the leading edge of the scraper 31 and the inner periphery of the separating tank 3 is sealed while the scraper 31 is moved. As shown in FIG. 1, the bottom of the separating tank 3 is connected to the storage tank 1, with a tube having a solenoid valve 34 therebetween. As shown in FIG. 4, the separating tank 3 includes a liquid surface level sensor 35. An alkaline solution to be processed is stored in the storage tank 1 and the foam on the alkaline solution is removed as follows.

Referring to FIG. 1, a foam phase is accumulated on the liquid surface level of the alkaline solution in the storage tank 1. The foam phase is sucked in the casing 21 through the suction tube 23 by the rotation of the impeller 22 of the processing unit 2. The foam phase then contacts the inner periphery of the casing 21 by the centrifugal force caused by rotating the impeller 22. As a result, the foam phase is defoamed to provide a mixture of fine foam and a liquid. The mixture is supplied to the separating tank 3 through the extraction tube 24 of the casing 21 and is accumulated in the separating tank 3. Scum is generated in the separating tank 3. This scum is generated in the mixture of the fine foam and the liquid in the separating tank 3. In other words, this scum is not the foam formed in the storage tank 1 but secondary foam.

The scraper 31 is rotated continuously. The mixture of the fine foam and the liquid from the processing unit 2 flows in the separating tank 3. The mixture is gradually accumulated as time goes on, i.e., as the above processing of the foam proceeds. Thus, the liquid surface level rises gradually. The scraper 31 keeps rotating. The liquid surface level in the separating tank 3 rises while the scum is accumulated on the liquid surface level.

When the upper surface of the scum in the separating tank 3 exceeds the lower edge of the scraper 31, the scum in the upper layer is scraped away with the scraper 31 and is discharged from the scum-discharging opening 33. This discharging of the scum continues until the rise in the liquid surface level under the scum is detected with the liquid surface level sensor 35. When the rise in the liquid surface level under the scum is detected, the solenoid valve 34 is opened so that the liquid in the separating tank 3 is recovered in the storage tank 1 by gravity flow. As a result, the separating tank 3 empties.

When a predetermined period of time of a timer elapses, the solenoid valve 34 is closed. The liquid and the scum start to accumulate in the separating tank 3 again. The volume of the liquid accumulated in the separating tank 3 is constant. The time required for recovering the liquid from the separating tank 3 by gravity flow is also constant.

In the separating tank 3, the scum is repeatedly separated and discharged and the liquid is also repeatedly separated and recovered in the same way.

The liquid recovered in the storage tank 1 is returned to the cleaning process of a metal strip for reuse. The scum discharged from the separating tank 3 is collected in the external sludge bag 4. The scum in the external sludge bag 4 is then disposed of.

The present embodiment describes an example in which an object to be cleaned is a metal strip in the iron-manufacturing industry. However, the object to be cleaned according to the present invention is not limited to the metal strip.

What is claimed is:

1. An apparatus for processing an alkaline solution comprising:
    a storage tank storing the alkaline solution that has been used for cleaning an object to be cleaned;
    a processing unit sucking a foam phase disposed on the liquid surface level of the alkaline solution in the storage tank, defoaming the foam phase by centrifugal separation, and extracting the foam phase outside the storage tank, the processing unit including an extraction tube;
    a separating tank separating scum from a liquid, the separating tank being connected to the extraction tube;
    a scum-discharging component discharging the scum in the separating tank outside the separating tank; and
    a liquid-discharging component discharging the liquid in the separating tank outside the separating tank,
    wherein the scum and the liquid separated in the separating tank are separately discharged outside the separating tank with the scum-discharging component and the liquid-discharging component, respectively.

2. The apparatus for processing an alkaline solution according to claim 1, wherein the liquid separated from the scum in the separating tank is recovered in the storage tank storing the alkaline solution.

3. The apparatus for processing an alkaline solution according to claim 1, wherein the scum separated from the liquid in the separating tank is disposed of outside a circulation path of the alkaline solution recycled for cleaning the object to be cleaned.

4. The apparatus for processing an alkaline solution according to claim 1,
wherein the processing unit comprises a casing including a suction tube leading to the foam phase area of the alkaline solution in the storage tank and the extraction tube leading to the separating tank, and an impeller disposed in the casing,
wherein the scum-discharging component comprises a scum outlet provided in the separating tank, and a collector collecting the scum disposed on the liquid surface level in the separating tank toward the scum outlet and discharging the scum from the scum outlet, and
wherein the liquid-discharging component comprises a tube having a solenoid valve attached to the separating tank.

5. The apparatus for processing an alkaline solution according to claim 4,
wherein the collector is a scraper extending along the liquid surface level of the liquid in the separating tank and moving on the liquid surface level so as to scrape away the scum disposed on the liquid surface level toward the scum outlet provided in the separating tank,
wherein the scum outlet of the separating tank is a scum-discharging opening forming a trough in the vertical direction,
wherein the position of an end of the scum-discharging opening in which the scum enters corresponds to the trajectory formed by the lower edge of the scraper, and
wherein the leading edge of the scraper is disposed in the vicinity of the inner peripheral wall of the separating tank.

6. The apparatus for processing an alkaline solution according to claim 5,
wherein the scum-discharging opening of the separating tank, the scum-discharging opening forming the trough in the vertical direction, comprises a soft material or a flexible material, and
wherein the position of an end of the scum-discharging opening in which the scum enters is somewhat higher than the trajectory formed by the lower edge of the scraper.

7. The apparatus for processing an alkaline solution according to claim 1, wherein the object to be cleaned is a metal strip in the iron-manufacturing industry.

8. The apparatus for processing an alkaline solution according to claim 2, wherein the scum separated from the liquid in the separating tank is disposed of outside a circulation path of the alkaline solution recycled for cleaning the object to be cleaned.

9. The apparatus for processing an alkaline solution according to claim 2,
wherein the processing unit comprises a casing including a suction tube leading to the foam phase area of the alkaline solution in the storage tank and the extraction tube leading to the separating tank, and an impeller disposed in the casing,
wherein the scum-discharging component comprises a scum outlet provided in the separating tank, and a collector collecting the scum disposed on the liquid surface level in the separating tank toward the scum outlet and discharging the scum from the scum outlet, and
wherein the liquid-discharging component comprises a tube having a solenoid valve attached to the separating tank.

10. The apparatus for processing an alkaline solution according to claim 3,
wherein the processing unit comprises a casing including a suction tube leading to the foam phase area of the alkaline solution in the storage tank and the extraction tube leading to the separating tank, and an impeller disposed in the casing,
wherein the scum-discharging component comprises a scum outlet provided in the separating tank, and a collector collecting the scum disposed on the liquid surface level in the separating tank toward the scum outlet and discharging the scum from the scum outlet, and
wherein the liquid-discharging component comprises a tube having a solenoid valve attached to the separating tank.

11. The apparatus for processing an alkaline solution according to claim 8,
wherein the processing unit comprises a casing including a suction tube leading to the foam phase area of the alkaline solution in the storage tank and the extraction tube leading to the separating tank, and an impeller disposed in the casing,
wherein the scum-discharging component comprises a scum outlet provided in the separating tank, and a collector collecting the scum disposed on the liquid surface level in the separating tank toward the scum outlet and discharging the scum from the scum outlet, and
wherein the liquid-discharging component comprises a tube having a solenoid valve attached to the separating tank.

12. The apparatus for processing an alkaline solution according to claim 9,
wherein the collector is a scraper extending along the liquid surface level of the liquid in the separating tank and moving on the liquid surface level so as to scrape away the scum disposed on the liquid surface level toward the scum outlet provided in the separating tank,
wherein the scum outlet of the separating tank is a scum-discharging opening forming a trough in the vertical direction,
wherein the position of an end of the scum-discharging opening in which the scum enters corresponds to the trajectory formed by the lower edge of the scraper, and
wherein the leading edge of the scraper is disposed in the vicinity of the inner peripheral wall of the separating tank.

13. The apparatus for processing an alkaline solution according to claim 10,
wherein the collector is a scraper extending along the liquid surface level of the liquid in the separating tank and moving on the liquid surface level so as to scrape away the scum disposed on the liquid surface level toward the scum outlet provided in the separating tank,
wherein the scum outlet of the separating tank is a scum-discharging opening forming a trough in the vertical direction,
wherein the position of an end of the scum-discharging opening in which the scum enters corresponds to the trajectory formed by the lower edge of the scraper, and
wherein the leading edge of the scraper is disposed in the vicinity of the inner peripheral wall of the separating tank.

14. The apparatus for processing an alkaline solution according to claim 11,
- wherein the collector is a scraper extending along the liquid surface level of the liquid in the separating tank and moving on the liquid surface level so as to scrape away the scum disposed on the liquid surface level toward the scum outlet provided in the separating tank,
- wherein the scum outlet of the separating tank is a scum-discharging opening forming a trough in the vertical direction,
- wherein the position of an end of the scum-discharging opening in which the scum enters corresponds to the trajectory formed by the lower edge of the scraper, and
- wherein the leading edge of the scraper is disposed in the vicinity of the inner peripheral wall of the separating tank.

15. The apparatus for processing an alkaline solution according to claim 12,
- wherein the scum-discharging opening of the separating tank, the scum-discharging opening forming the trough in the vertical direction, comprises a soft material or a flexible material, and
- wherein the position of an end of the scum-discharging opening in which the scum enters is somewhat higher than the trajectory formed by the lower edge of the scraper.

16. The apparatus for processing an alkaline solution according to claim 13,
- wherein the scum-discharging opening of the separating tank, the scum-discharging opening forming the trough in the vertical direction, comprises a soft material or a flexible material, and
- wherein the position of an end of the scum-discharging opening in which the scum enters is somewhat higher than the trajectory formed by the lower edge of the scraper.

17. The apparatus for processing an alkaline solution according to claim 14,
- wherein the scum-discharging opening of the separating tank, the scum-discharging opening forming the trough in the vertical direction, comprises a soft material or a flexible material, and
- wherein the position of an end of the scum-discharging opening in which the scum enters is somewhat higher than the trajectory formed by the lower edge of the scraper.

18. The apparatus for processing an alkaline solution according to claim 2, wherein the object to be cleaned is a metal strip in the iron-manufacturing industry.

19. The apparatus for processing an alkaline solution according to claim 3, wherein the object to be cleaned is a metal strip in the iron-manufacturing industry.

20. The apparatus for processing an alkaline solution according to claim 4, wherein the object to be cleaned is a metal strip in the iron-manufacturing industry.

21. The apparatus for processing an alkaline solution according to claim 5, wherein the object to be cleaned is a metal strip in the iron-manufacturing industry.

22. The apparatus for processing an alkaline solution according to claim 6, wherein the object to be cleaned is a metal strip in the iron-manufacturing industry.

* * * * *